(No Model.)
I. MOE.
RETURN DEVICE FOR CHILDREN'S CARRIAGES.
No. 582,997. Patented May 18, 1897.
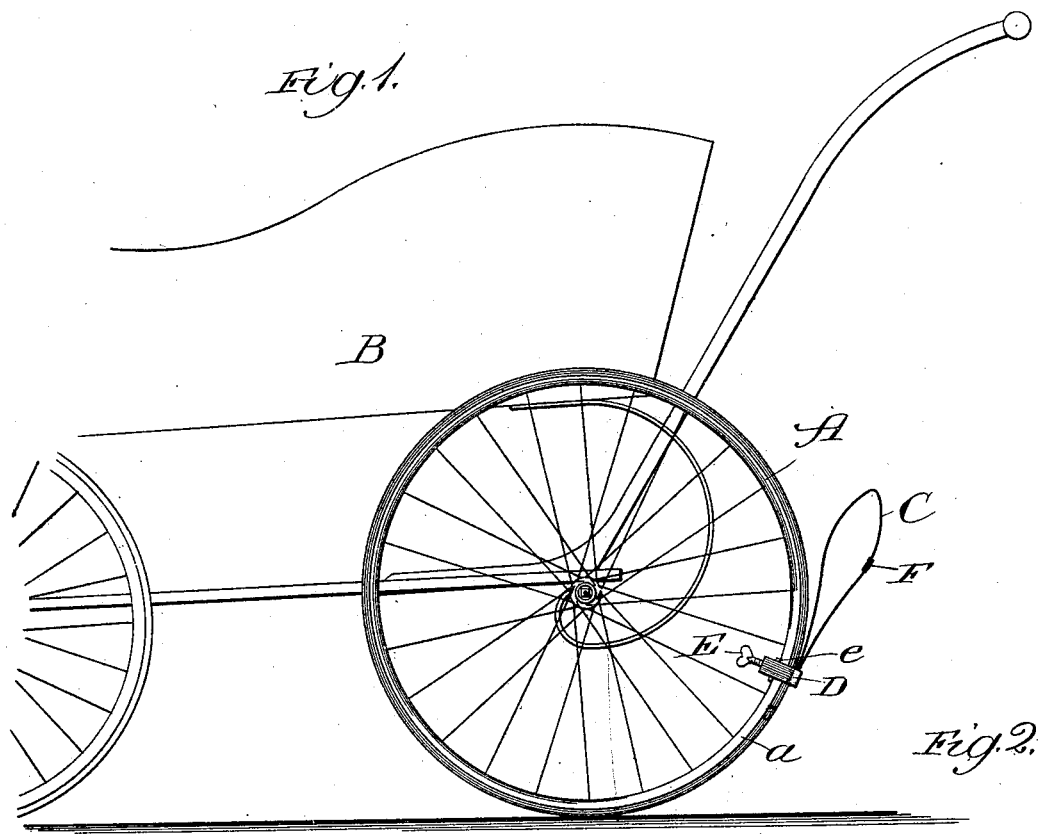
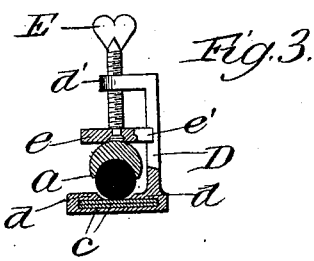
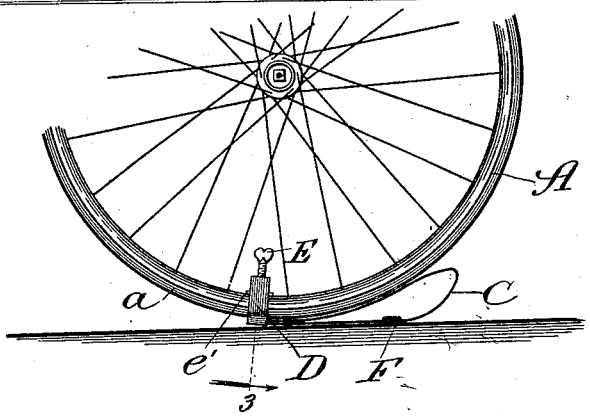
Witnesses:
Inventor:
Ingwald Moe,
By Samuel E. Hibben
Att'y

UNITED STATES PATENT OFFICE.

INGWALD MOE, OF CHICAGO, ILLINOIS.

RETURN DEVICE FOR CHILDREN'S CARRIAGES.

SPECIFICATION forming part of Letters Patent No. 582,997, dated May 18, 1897.

Application filed October 7, 1896. Serial No. 608,161. (No model.)

*To all whom it may concern:*

Be it known that I, INGWALD MOE, residing at Chicago, in the county of Cook and State of Illinois, have invented a new and useful Automatic Return Device for Baby-Carriages or other Vehicles, of which the following is a specification.

My invention consists of an attachment for vehicles, and is particularly designed for and applicable to a baby-carriage, whereby it may be reciprocated or moved to and fro, the carriage being automatically returned after a forward movement from the attendant.

The device comprises a spring, preferably substantially elliptical, adapted to be attached to the rim of one of the wheels and to be compressed thereby between the ground or floor and the rim in the movement of the wheel away from the attendant, whereby the carriage will be automatically given a return movement by reason of the force of expansion of the spring against the rim. Moreover, the attachment is simple and inexpensive in manufacture, ready of attachment, and efficient in use, as will be apparent from the description hereinafter given.

In the accompanying drawings, Figure 1 is a side elevation of a baby-carriage, showing my attachment applied to one of the rear wheels thereof; Fig. 2, an elevation of a portion of the wheel, showing compression of the spring by the wheel prior to the return movement; and Fig. 3, a section of the attaching or clamping device on the line 3 of Fig. 2.

The device may be attached to the rim $a$ of one of the rear wheels A of the carriage B, as shown, or a pair may be used, one for each rear wheel, or, if desired, they may be applied in similar manner to the front wheel or wheels.

In constructing my attachment I first take a spring C, which is preferably substantially elliptical in shape, although any other spring capable of performing the function desired may be employed. This spring is preferably not continuous, but has free ends $c$, which are received and held in the base of a clamping device D. In order to firmly hold the ends of the spring and at the same time prevent the rim of the wheel from slipping sidewise when clamped, I prefer to provide the base of the clamp with extended flanges $d$, between which the rim is clamped. As shown in Fig. 3, the clamp has a projection or lug $d'$, which is internally screw-threaded to receive a clamping or thumb screw E. This thumb-screw is swiveled in a follower-plate or foot $e$, which is provided with guides $e'$, bearing against and guided by the upright portion of the clamp. Any other suitable means may be adopted to clamp the spring in the desired position to the rim of the wheel, but the device shown will be found preferable and desirable for the general market, as it has a wide range of adjustment, and is therefore capable of fitting any size of rim. I do not, however, limit myself to the particular clamp shown.

In order to prevent a sliding of the spring upon the floor or ground, I attach a block or strip F of suitable material, such as rubber and the like, upon the lower member of the spring, which strip contacts the floor during the compression of the spring, as illustrated in Fig. 2.

My device being constructed as hereinbefore set forth is applied to the rim of a wheel, as clearly shown in the drawings. The rim is clamped between the ends of the spring and follower-plate by screwing down the thumb-screw. The spring may be attached at any point on the wheel-rim, according to the distance it is desired the carriage to travel before being returned, so that the carriage may be caused to travel at the most one rotation of the wheel before return, or any less distance according to the predetermined location of the spring. When made and applied as shown in the drawings, it is obvious that the spring is located in the same vertical plane as the wheel and in its path of travel.

When the carriage is pushed backward, the spring will be carried around with the wheel, which will contact and run upon the upper member of the spring, the lower member being pressed against the floor, whereby the spring is compressed. The momentum of the carriage being exhausted, the spring, now compressed and pressing against the wheel, will cause the automatic return of the carriage to the attendant, who repeats the operation by giving another push to the carriage, and so on.

My attachment is made as a new article of manufacture and is capable of simple and convenient application to any baby-carriage regardless of the ordinary differences in the size of the rims. The clamping device is adjustable and made to accommodate various sizes.

It is obvious that the carriage may be returned backward by the spring after a forward push by simply reversing the position of the spring. Furthermore, it is obvious that more than one spring may be employed, and that any forms of springs, similarly or differently located, may be adopted without departing from the nature and scope of my invention.

Although I have described more or less precise forms and details of construction, I do not intend to be understood as limiting myself thereto, as I contemplate changes in form, proportion of parts, and the substitution of equivalents as circumstances may suggest or render expedient, and, furthermore, I contemplate using my invention wherever applicable and in its manifold ways.

I claim—

1. As a new article of manufacture, a return device for a vehicle-wheel comprising a spring adapted to be compressed by the wheel and to return the same.

2. As a new article of manufacture, an attachment for a vehicle-wheel comprising a spring and means for securing the same to the rim of the wheel, such spring being compressed by the running of the wheel upon the spring and adapted to return the wheel.

3. In a vehicle, the combination with a wheel of a spring secured to the rim of the wheel and adapted to return the wheel after compression by the rim.

4. In a vehicle, the combination with a wheel, of a spring and a clamp for removably securing the spring to the rim of the wheel.

5. In a vehicle, the combination with a wheel, of a strip of resilient material attached to the rim of the wheel and in the same plane and in the path of travel, whereby as the wheel is moved the spring will be compressed between the floor or ground and the rim of the wheel and will rotate the wheel in the opposite direction and return the vehicle.

6. An attachment for baby-carriages and the like comprising in combination with a wheel, a spring substantially elliptical in shape and means for attaching the spring to the rim of the wheel and in the same plane as the wheel.

7. An attachment for baby-carriages and the like comprising in combination with a wheel a spring substantially elliptical in shape and a clamping device secured to one end of such spring and adapted to attach the same to the rim of the wheel and in the same plane therewith whereby as the wheel is moved it will roll upon the spring to compress the spring and to eventually return the vehicle.

8. An attachment for baby-carriages and the like, comprising in combination with a wheel, a spring attached to the rim of the wheel and in the same plane and means upon said spring to prevent sliding when the wheel has moved and rolled upon the spring to compress the same.

9. An attachment for baby-carriages and the like, comprising in combination with a wheel, a substantially elliptical spring secured at one end to the rim of the wheel and in its path of travel and a strip or block of rubber or similar material upon the lower member of the spring for contacting the floor or ground to prevent sliding when the wheel rolls upon the spring.

10. An attachment for baby-carriages comprising in combination with a wheel A, an elliptical spring C and a device D for clamping one end of the spring to the rim at a predetermined point.

INGWALD MOE.

Witnesses:
J. N. HANSON,
SAMUEL E. HIBBEN.